Aug. 1, 1961
R. V. KERLEY
2,994,344
MULTIPLE ORIFICE FLOW CONTROL DEVICE
Filed April 14, 1960
2 Sheets-Sheet 1
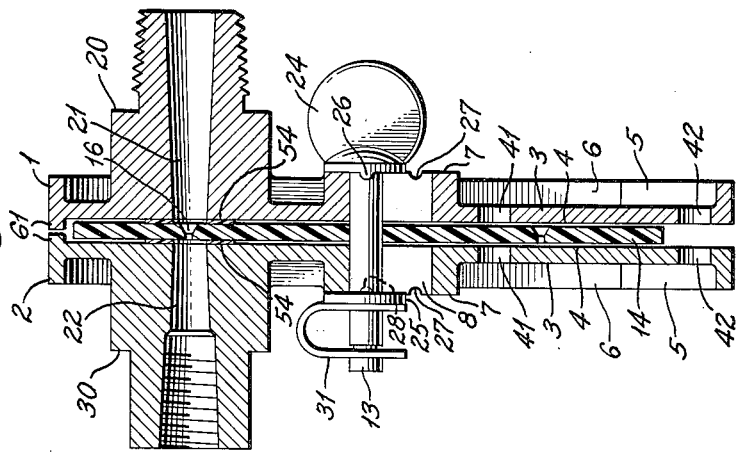
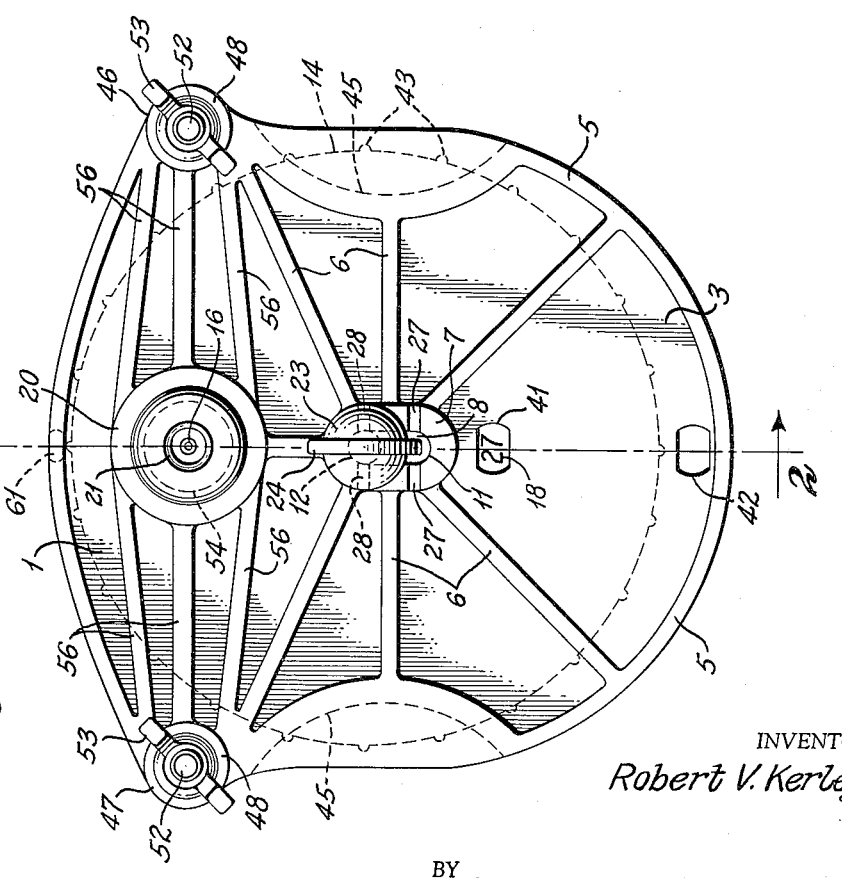
INVENTOR
Robert V. Kerley
BY
Irons, Birch, Swindler & McKie
ATTORNEYS Aug. 1, 1961 R. V. KERLEY 2,994,344
MULTIPLE ORIFICE FLOW CONTROL DEVICE
Filed April 14, 1960 2 Sheets-Sheet 2
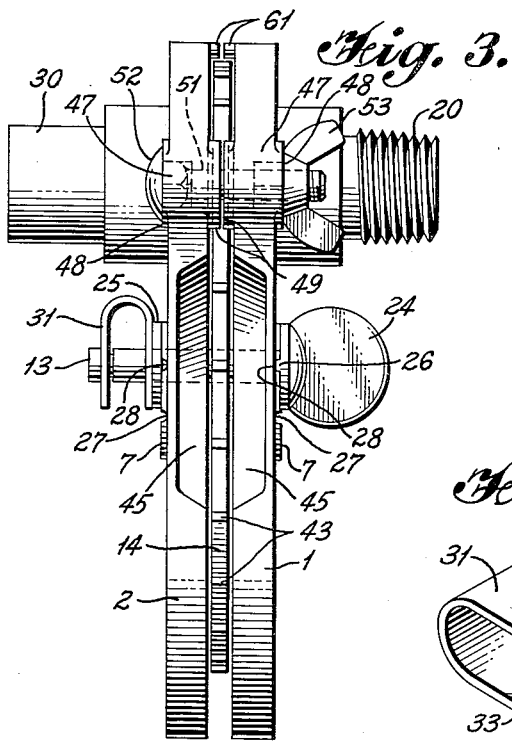
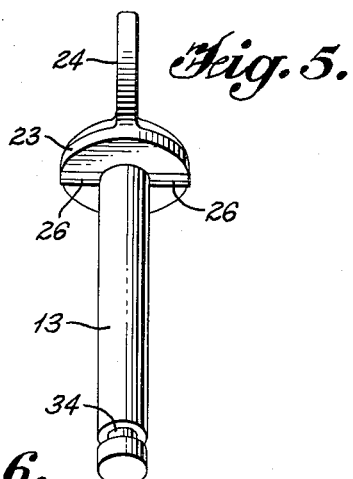
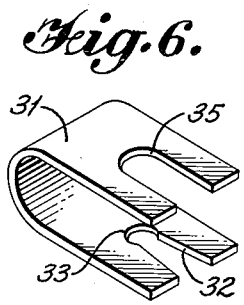
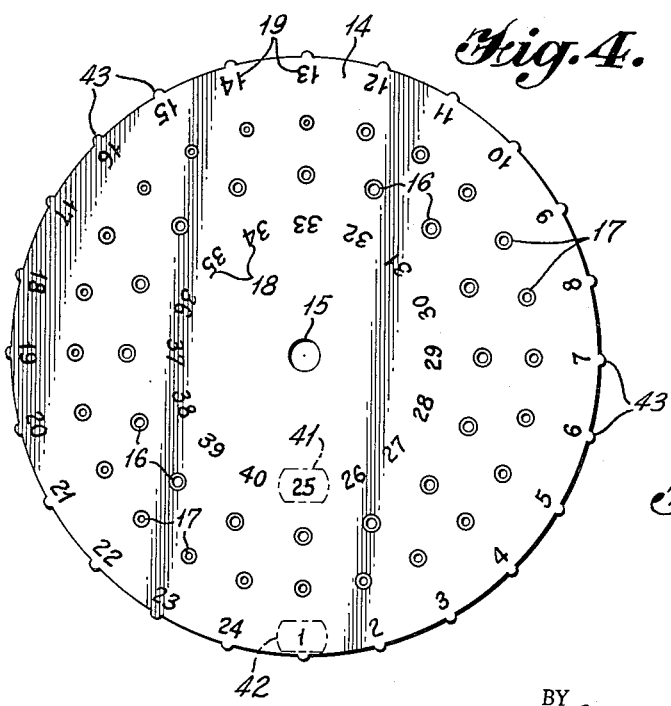
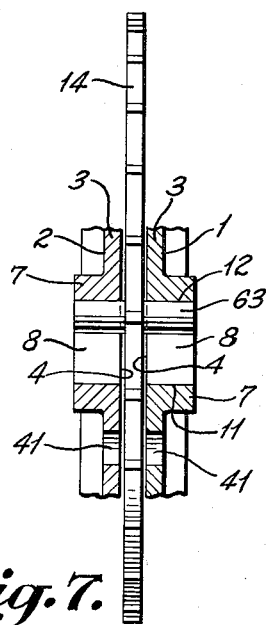
INVENTOR
Robert V. Kerley
BY Irons, Birch, Swindler & McKie
ATTORNEYS

United States Patent Office 2,994,344
Patented Aug. 1, 1961

2,994,344
MULTIPLE ORIFICE FLOW CONTROL DEVICE
Robert V. Kerley, 2801 W. Osborn Road, Phoenix, Ariz.
Filed Apr. 14, 1960, Ser. No. 22,181
10 Claims. (Cl. 137—556)

The present invention relates generally to flow control devices and, more particularly, to those incorporating a rotary disc containing multiple orifices through which fluid may be selectively metered.

Multiple orifice flow control devices have been utilized in various circumstances, such as to meter the flow of anhydrous ammonia gas under high pressure into irrigation water. None of the heretofore available devices has proved entirely satisfactory.

An object of this invention is to provide an improved multiple orifice device for metering the flow of fluids, which is highly dependable and versatile, easily adjusted, and subject to little wear.

The invention resides generally in certain structural improvements in a flow control device embodying a pair of opposed cover plates having aligned flow passages extending therethrough, a multiple orifice valve disc disposed between the cover plates, means pivotally connecting the disc to cover plates to selectively align any of the orifices with the flow passages, and means to clamp the cover plates together to sealingly retain the disc with a selected orifice communicating with said flow passages.

A specific embodiment of the invention will now be described in detail, with reference to the accompanying drawings, in which:

FIGURE 1 is a plan view of the apparatus of the invention;

FIGURE 2 is a vertical sectional view taken along the line 2—2 of FIGURE 1;

FIGURE 3 is a side elevation of the apparatus of FIGURE 1;

FIGURE 4 is a plan view of the valve disc;

FIGURE 5 is a perspective view of one form of pin about which the valve disc is pivoted;

FIGURE 6 is a perspective view of a clip for securing one end of the pin of FIGURE 5; and FIGURE 7 is a fragmentary sectional view showing the valve disc connected to the cover plates by a modified form of pivot pin.

The flow control device of the invention includes a pair of opposed cover plates 1 and 2, each of which comprises a web 3 having a smooth, flat inner face 4. The outer face of each of the plates 1 and 2 is provided with a peripheral reinforcing flange 5 with radial reinforcing ribs 6 extending from the flange 5 to a raised hub or boss 7 in the center of the cover plate. Extending through each of the hubs is an elongated slot 8, the opposite ends of which are rounded to serve as sockets 11 and 12 for a pivot pin 13, which extends through both of the plates 1 and 2.

Pivotally mounted on the pin 13 and disposed between the cover plates 1 and 2 is a valve disc 14 shown in detail in FIGURE 4. The pin 13 is received in central opening 15 in the valve disc 14. The disc 14 is provided with a pair of pluralities of variously sized orifices. One of the pluralities of orifices 16 is disposed in a circular line about the opening 15 as a center. The second plurality of orifices 17 is also arranged in a circular line, radially outside of the orifices 16 and concentric therewith. Preferably the orifices in each circle have different diameters which progressively increase around the circle and all of the orifices in one circle are of larger diameter than of the orifices in the other circle.

A circular line of indicia 18, which correspond to the orifices 16, is provided concentric with the orifices 16 and radially inside thereof. A second group of indicia 19 corresponding to the orifices 17 is arranged in a circular line concentrically outside of the orifices 17. Each of the indicia 17 and 18 is preferably disposed diametrically opposite the orifice to which it corresponds.

Passages 21 and 22 extend axially through the cover plates 1 and 2, respectively, and through elongated protrusions 20 and 30 which extend from the outer faces of the cover plates 1 and 2.

The orifices 16 and 17 may be selectively aligned with passages 21 and 22, by rotating the disc 14 about the pivot pin 13. Threaded connections are provided at the outer ends of the protrusions 20 and 30 to permit connection to the passages 21 and 22 of incoming and outgoing conduits (not shown) for the fluid to be metered. For example, one of the passages may be connected to a source of anhydrous ammonia under high pressure and the other passage may be connected to a supply of irrigation water to which the ammonia is to be added in controlled amounts.

When the pivot pin 13, with the valve disc 14 mounted thereon, is positioned in the socket 12, the circular line of orifices 16 is aligned with the passages 21 and 22 to provide communication therebetween through any of the orifices 16, by rotation of the disc to bring the selected orifice into alignment with the passages. Similarly, when the pivot pin 13, with the disc 14 mounted thereon, is moved to the socket 11, the circle of orifices 17 is aligned with the passages 21 and 22 to permit any of the orifices 17 to be aligned with the passages, thereby providing communication therebetween.

The pivot pin 13 preferably is removable from the disc 14 and cover plates 1 and 2, thereby facilitating removal of the disc from between the cover plates. The pivot pin has a flat head 23 to which is attached a wing handle 24. Mounted on the other end of the pin 13 is a removable washer 25. The head 23 is provided with an inwardly extending detent 26, which is received in slots 27 or 28 in the outer surface of the hub 7. The end of the pivot pin 13, opposite the head 23, is held firmly in place by a generally U-shaped spring clip 31. The outermost leg of the U-shaped spring clip 31 is provided with an inwardly tapered slot 32, which terminates in a round opening 33, which is adapted to receive a reduced portion 34, situated near the end of the pivot pin 13. The diameter of the opening 33 is less than the diameter of the portions of the body of pin 13 on the opposite sides of the reduced portion 34. Thus, movement of the outer leg of the spring clip axially along the pivot pin 13 is prevented when the reduced portion 34 is received in the opening 33. The inner leg of the spring clip 31 is provided with a slot 35, which embraces the body portion of the pin 13 and is freely movable therealong. Thus, when the opening 33 is received in the reduced portion 34, as shown in FIGURE 3, the inner leg of the U-shaped clip 31 presses against the washer 25 which is thus resiliently held against the cover plate 2. This resilient action retains the detent 26 in the slot 27 or the slot 28 as the case may be, and consequently resiliently and removably retains the pivot pin 13 in either of the sockets 11 or 12. With the pivot pin in socket 11, any of the orifices 17 may be brought into alignment with the passages 21 and 22 by rotation of the disc. Similarly with the pivot pin in the socket 12, any of the orifices 16 may be brought into alignment with the passages 21 and 22 by rotation of the disc.

A viewing opening 41 is provided in each of the cover plates 1 and 2 positioned in alignment with the circular line of indicia 18 when the circular line of orifices 16 is in alignment with the through passages 21 and 22. Correspondingly, a viewing opening 42 is provided in each of the cover plates 1 and 2 in alignment with the circular line of indicia 19 when the circular line of orifices 17 is in alignment with the passages 21 and 22. Accordingly, when any orifice in either of the lines 16 or 17 is aligned with the passages 21 and 22, the corresponding indicia is viewable through the windows 41 or 42, respectively.

To facilitate rotation of the orifice disc 14 its peripheral edge is knurled by the provision of a plurality of knobs 43. As best seen in FIGURE 1, the cover plates 1 and 2 are sufficiently larger than the orifice disc 14 so that the disc 14 lies completely within the periphery of the cover plates 1 and 2 in either of its alternative operative positions. In order that the disc 14 may be rotated by hand, finger openings are formed in the inside edges of the cover plates 1 and 2. As best seen in FIGURE 3, these finger openings are defined by opposed depressions 45 in the plates 1 and 2. Each depression 45 extends radially from the periphery of its cover plate to a location inside of the circumference of the disc as illustrated in FIGURE 1. The depressions 45 are sufficiently deep in an axial direction so that the finger of an operator may be received therein. The depressions 45 extend axially from the inner surface of the cover plates and terminate short of the outer surface of the cover plates. Thus, the edges of the discs are still covered by the cover plates.

The disc 14 may be clamped against rotation in any desired position by the cover plates 1 and 2. To this end there are provided a pair of protruding ears 46 and 47 at the periphery of each of the cover plates 1 and 2. Each of the ears is provided with opposed circular bosses 48 and 49 through which an opening 51 extends to receive a bolt 52. The outer boss 48 is counter sunk to receive a squared portion of the bolt head. A wing nut 53 is threadedly received on the end of the bolt 51 opposite the head. When the nut 53 is tightened, the cover plates 1 and 2 are clamped together into gripping relationship with the disc 14.

The bosses 49 protrude from the inner face of the cover plate a distance substantially equal to or very slightly less than one-half of the thickness of the disc 14. Similarly, a pair of opposed protrusions 61 extend a like distance from the peripheral edge of the inner face of each of the cover plates 1 and 2 on the line extending between the sockets 11 and 12 and the passages 21 and 22. When the plates are clamped together, the bosses 49 on the cover plates 1 and 2 abut one another and the protrusions 61 abut one another to prevent damage to the disc 14 due to the clamping action. The cover plates preferably are free of protrusions extending from the inner faces thereof within the diameter of the disc on the side of the pivot pin opposite to the passages 21 and 22. Thus, removal of the disc can be effected by removing the pivot pin, loosening the clamps only a slight amount, and sliding the disc out from between the cover plates. Such removal may be accomplished even though the clamping means have been loosened to such a small extent that the opposed protrusions remain spaced apart a distance less than the thickness of the disc.

A sealing ring 54 is mounted on the inner face of each of the cover plates 1 and 2 surrounding the inner ends of the passages 21 and 22. This sealing ring preferably comprises a thin, flat plastic ring cemented to the cover plates 1 and 2. Thus, when the cover plates are clamped together with a desired orifice communicating with the passages 21 and 22, leakage is effectively prevented.

As illustrated in FIGURE 1, the ears 46 and 47 with their associated clamping means preferably are located on a line which extends through the center of the passages 21 and 22 and is normal to a line extending through the center of the passages 21 and 22 and the sockets 11 and 12. Reinforcing ribs 56 are provided on the outer surface of each of the cover plates 1 and 2 extending between the bosses 46 and 47 and the protrusions 20 and 30. This construction enables the flow control device of the invention to be employed to meter extremely high pressure gases with minimum danger to operators and minimum chance of leakage or equipment damage. At the same time there is no necessity for a clamp at the pivot point of the disc 14. The clip 31 merely serves to hold the pivot pin in its desired location and does not serve as a clamp to hold the cover plates 1 and 2 together. As such a clamp, the clip 31 would be completely ineffective.

Disclosed in FIGURE 7 is a modified form of pivot pin 63 which is rigidly mounted on the disc 14. If desired, the pin 63 may be rotatable with respect to the disc 14 but should be anchored against axial movement out of the disc so that the pivot pin is retained against accidental removal. The pivot pin 63 is freely slidable along the slots 8 between sockets 11 and 12 when the clamping means are loose. In this embodiment the clamps provided by the bolts 52 are the sole means of preventing displacement of the pivot pin 63 from the pivot socket in which it is mounted. In the embodiment of FIGURE 7 the pivot pin construction is substantially simplified but it is necessary to separate the cover plates 1 and 2 before the disc 14 can be removed.

There has been illustrated and described what is considered to be preferred embodiments of the invention. It will be understood that various modifications can be made by persons skilled in the art without departing from the scope of the invention as defined by the claims.

I claim:

1. A flow control device which comprises a pair of opposed cover plates having aligned flow passages extending therethrough, a valve disc disposed between said cover plates and having first and second pluralities of orifices arranged in first and second circular lines on said valve disc and extending therethrough, means to pivotally connect said valve disc to said cover plates selectively at first and second positions with said first and second lines of orifices, respectively, in alignment with said flow passages, and means to clamp said cover plates together with said disc sealingly retained with a selected orifice communicating with said flow passages.

2. A flow control device, as recited in claim 1, wherein said pivotal connecting means comprises a pin protruding from both faces of said disc and a pair of spaced sockets in each of said cover plates to rotatably receive said pin with said disc at said first and second positions, respectively.

3. A flow control device, as recited in claim 2, wherein said cover plates have opposed slots extending therethrough with the ends of said sockets defined by the ends of said slots to permit said disc to be moved between said first and second positions without disassembling said cover plates.

4. A flow control device, as recited in claim 3, wherein means are provided to removably retain said pin at each of said positions.

5. A flow control device, as recited in claim 1, wherein said disc is provided with first and second pluralities of indicia corresponding to the orifices and arranged in first and second circular lines, at least one of said cover plates having a viewing opening aligned with said first line of indicia and at least one of said cover plates having a viewing opening aligned with said second line of indicia, when said disc is at said first and second positions, respectively.

6. A flow control device which comprises a pair of opposed cover plates having aligned flow passages extending therethrough, a valve disc disposed between said cover plates and having a plurality of orifices arranged in a circular line on said valve disc and extending therethrough, means to pivotally connect said valve disc to said cover plates with said line of orifices in alignment with said passages, and a pair of clamping means located at positions outside of said disc on opposed sides of a line between said passages and said pivotal connecting means to clamp said cover plates together with said disc sealingly retained with a selected orifice communicating with said flow passages.

7. A flow control device which comprises a pair of opposed cover plates having aligned flow passages extending therethrough, a valve disc disposed between said cover plates and having a plurality of orifices arranged in a circular line on said valve disc and extending therethrough, means to pivotally connect said valve disc to said cover plates with said line of orifices in alignment with said passages, said pivotally connecting means including a pin removably inserted through said disc, and a pair of clamping means located at positions outside of said disc on opposite sides of a line between said passages and said pivotal connecting means to clamp said cover plates together with said disc sealingly retained with a selected orifice communicating with said flow passages, opposed protrusions extending inwardly from said cover plates to about one another to resist the force of said clamping, said plates being free of inward protrusions with the diameter of said disc on the opposite side of said pin from said passages to permit removal of said disc by slight loosening of said clamping means while said opposed protrusions are spaced apart a distance less than the thickness of said disc.

8. A flow control device which comprises a pair of opposed cover plates having aligned flow passages extending therethrough, a valve disc disposed between said cover plates and having first and second pluralities of orifices arranged in first and second circular lines on said valve disc and extending therethrough, means to pivotally connect said valve disc to said cover plates selectively at first and second positions with said first and second lines of orifices, respectively, in alignment with said flow passages, and a pair of clamping means located at positions outside of said disc on opposite sides of a line between said passages and said pivotal connecting means to clamp said cover plates together with said disc sealingly retained with a selected orifice communicating with said flow passages.

9. A flow control device which comprises a pair of opposed cover plates having aligned flow passages extending therethrough, a valve disc having a plurality of orifices arranged in a circular line on said valve disc and extending therethrough, said disc being disposed between said cover plates with the circumference of said disc completely within the periphery of said cover plates, said cover plates having opposed depressions on other inner faces extending from their peripheries to locations inside of the circumference of said disc to provide access to the periphery of said disc for rotation thereof, said depressions being covered by the outer walls of said cover plates within the circumference of said disc, means to pivotally connect said valve disc to said cover plates with said line of orifices in alignment with said passages, and means to clamp said cover plates together with said disc sealingly retained with a selected orifice communicating with said flow passages.

10. A flow control device which comprises a pair of opposed cover plates having aligned flow passages extending therethrough, a valve disc having first and second pluralities of orifices arranged in first and second circular lines on said valve disc and extending therethrough, said disc being disposed between said cover plates with the circumference of said disc completely within the periphery of said cover plates, said cover plates having opposed depressions on their inner faces extending from their peripheries to locations inside of the circumference of said disc to provide access to the periphery of said disc for rotation thereof, means to pivotally connect said valve disc to said cover plates selectively at first and second positions with said first and second lines of orifices, respectively, in alignment with said flow passages, and a pair of clamping means located at position outside of said disc on opposite sides of a line between said passages and said pivotal connecting means to clamp said cover plates together with said disc sealingly retained with a selected orifice communicating with said flow passages.

References Cited in the file of this patent

UNITED STATES PATENTS

| | | |
|---|---|---|
| 1,813,100 | Swindle | July 7, 1931 |
| 2,100,366 | Tyler | Nov. 30, 1937 |
| 2,740,423 | Stillwagon | Apr. 3, 1956 |
| 2,912,776 | Koeber | Nov. 17, 1959 |
| 2,939,420 | Hewitt | June 7, 1960 |